United States Patent
Hironaka et al.

(10) Patent No.: US 12,518,010 B2
(45) Date of Patent: Jan. 6, 2026

(54) STORAGE DEVICE WITH RANSOMWARE ATTACK DETECTION FUNCTION AND MANAGEMENT SYSTEM

(71) Applicant: Hitachi, Ltd., Tokyo (JP)

(72) Inventors: Kazuei Hironaka, Tokyo (JP); Akira Deguchi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 294 days.

(21) Appl. No.: 18/119,975

(22) Filed: Mar. 10, 2023

(65) Prior Publication Data

US 2024/0126880 A1 Apr. 18, 2024

(30) Foreign Application Priority Data

Oct. 13, 2022 (JP) ................................. 2022-164930

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC .................................................... G06F 21/566
See application file for complete search history.

(56) References Cited

U.S. PATENT DOCUMENTS

| 10,055,582 | B1 | 8/2018 | Weaver et al. |
| 10,078,459 | B1 | 9/2018 | Natanzon et al. |
| 10,409,986 | B1 | 9/2019 | Natanzon et al. |
| 10,609,066 | B1 | 3/2020 | Nossik et al. |
| 2020/0042707 | A1 | 2/2020 | Kucherov et al. |
| 2020/0099699 | A1 | 3/2020 | Saad |
| 2020/0387430 | A1* | 12/2020 | Hironaka ............ G06F 11/1469 |

* cited by examiner

*Primary Examiner* — Alexander Lagor
*Assistant Examiner* — Shu Chun Gao
(74) *Attorney, Agent, or Firm* — Procopio, Cory, Hargreaves & Savitch LLP

(57) ABSTRACT

A storage device receives an access request specifying one of one or more LDEVs (one or more logical volumes provided to one or more hosts) from one host. In response to the access request, the storage device accesses a page allocated to an access destination area of the LDEV among a plurality of pages (plurality of logical storage areas that can be allocated to one or more LDEVs). The storage device or a storage device management system identifies, based on management information including information representing a write status characteristic for each of the plurality of pages, a mark target page as a low-write frequency page where a certain number or more of writes have occurred during a certain period of time and checks the presence or absence of a ransomware attack possibility that the number of the mark target pages is equal to or greater than a threshold.

13 Claims, 11 Drawing Sheets

FIG. 5
LDEV MANAGEMENT TABLE
401

| LDEV NUMBER | LDEV CAPACITY | VOL TYPE | POOL NUMBER |
|---|---|---|---|
| 1 | 1TB | EVOL | 1 |
| 2 | 2B | TPVOL | 1 |
| 3 | 320GB | TPVOL | 1 |
| 4 | 500GB | RVOL | 2 |
| ... | ... | ... | ... |

ADDRESS MANAGEMENT TABLE
404

FIG. 7
POOL MANAGEMENT TABLE
400

| POOL NUMBER | POOL CAPACITY | POOL ALLOCATED CAPACITY | POOL USED CAPACITY |
|---|---|---|---|
| 1 | 10TB | 4TB | 1TB |
| 2 | 20TB | 4TB | 2.2TB |
| 3 | 30TB | 10TB | 8TB |
| ... | ... | ... | ... |

PAGE MANAGEMENT TABLE
403

POOL VOL MANAGEMENT TABLE
402

FIG. 10

PAGE ACCESS MANAGEMENT TABLE
405

PAGE ACCESS MANAGEMENT SUB-TABLE
1000

| PAGE NUMBER | TIME STAMP | READ I/O COUNT | WRITE I/O COUNT | SEQUENTIAL ACCESS RATIO | RANDOM ACCESS RATIO | WRITE DATA AMOUNT | READ DATA AMOUNT |
|---|---|---|---|---|---|---|---|
| 0 | 20220831150000 | 10020 | 205 | 45% | 55% | 108MB | 1678MB |
| 1 | ... | ... | ... | ... | ... | ... | ... |
| 2 | ... | ... | ... | ... | ... | ... | ... |
| 3 | ... | ... | ... | ... | ... | ... | ... |
| ... | | | | | | | |

1002  1001  1003  1004  1005  1006  1007  1008

... 1000

| POOL NUMBER |
|---|
| 1 |
| 2 |
| 3 |
| ... |

1010

STORAGE DEVICE WITH RANSOMWARE ATTACK DETECTION FUNCTION AND MANAGEMENT SYSTEM

BACKGROUND OF THE INVENTION

1. Field of the Invention

The present invention generally relates to data processing performed by a storage device.

2. Description of Related Art

Cyber-attacks on IT systems are on the increase nowadays. In particular, malware known as ransomware encrypts or destroys data stored in an IT system, making the system unusable, and performs a cyber-attack to demand a ransom or the like in exchange for restoring the data. The damage caused by ransomware continues both domestically and internationally. Therefore, features or solutions to improve system resiliency are gaining attention in IT systems.

In particular, storage devices store data for various IT systems. As a result, these devices are easily targeted by data-destructive cyber-attacks such as ransomware. In this regard, a technique for detecting data destruction by ransomware and protecting data is provided.

For example, with respect to the technique disclosed in U.S. Ser. No. 10/055,582B, a security appliance installed outside of a storage device records operational events (the number of file name changes, the number of file updates, or the like) related to a monitored target file stored in the storage device and uses the monitoring information to detect ransomware attacks.

In addition, each of U.S. Ser. No. 10/409,986B and U.S. Ser. No. 10/078,459B discloses a storage device that monitors a change in data entropy in write I/O of a host accessing the storage device and detects a ransomware attack based on the degree of the change.

In addition, with respect to the technique that is disclosed in U.S. Ser. No. 10/609,066B, decoy files for ransomware detection are installed in data storage areas of a storage device and a change attributable to data tampering in the decoy files is detected as a ransomware attack.

In addition, with respect to the storage device that is disclosed in US2020/0042707A, data volume snapshots are regularly acquired in the storage device and a ransomware attack is detected when the amount of data difference between the acquired snapshots or the difference in volume compression rate satisfies specified conditions.

In addition, with respect to the technique that is disclosed in US2020/0099699A, in view of the fact that a ransomware attack causes host I/O data to be encrypted and the efficiency of data compression or data deduplication to be degraded, an appliance installed outside a storage device performs host I/O monitoring and detects a ransomware attack when the change in data compression rate or data deduplication rate for a certain period of time (sliding-window) exceeds a threshold.

In general, ransomware is the practice of obtaining money, such as a ransom, by making data stored in an IT system useless rather than destroying the IT system itself. Therefore, the ransomware has used an attack strategy method to tamper with stored data without a system user noticing. For example, one type of ransomware performs a data destruction attack by excluding data required for system operation from attack targets and tampering with other data with the IT system itself continuing to operate normally. In addition, in many cases, a sophisticated tampering process implementation is applied such that an attack can be completed quickly, such as encrypting stored data only in part.

Therefore, in many actual ransomware attacks, it takes a lot of time from actual attack initiation until actual damage becomes substantial or the attack is countered (that is, the damage becomes extensive in the IT system).

Most of the ransomware attack detection techniques of the related art disclosed in (U.S. Ser. No. 10/055,582B, U.S. Ser. No. 10/409,986B, U.S. Ser. No. 10/078,459B, U.S. Ser. No. 10/609,066B, US2020/0042707A, and US2020/0099699A) are to monitor time-series information (for example, a host I/O-attributable change in data entropy, fluctuations in stored data compression rate or data deduplication rate, and the amount of data change between regularly acquired data snapshots) and detect a ransomware attack from the amount of change therein. In other words, a ransomware attack is undetectable until some progress of the ransomware attack.

However, since ransomware is a covert attack (such as encrypting stored data only in part) as described above, it is conceivable that there are many practical difficulties in detecting the attack by a detection method based on a time-series change in monitoring information as in the related art. In other words, the amount of a time-series change is moderate, and thus it is difficult to detect a ransomware attack even after the passage of time, which may lead to an increase in the impact of ransomware attack-attributable damage.

SUMMARY OF THE INVENTION

A storage device receives an access request specifying one of one or more LDEVs (one or more logical volumes provided to one or more hosts) from one host. In response to the access request, the storage device accesses a page allocated to an access destination area of the LDEV among a plurality of pages (plurality of logical storage areas that can be allocated to one or more LDEVs). The storage device or a storage device management system identifies, based on management information including information representing a write status characteristic for each of the plurality of pages, a mark target page as a low-write frequency page where a certain number or more of writes have occurred during a certain period of time and checks the presence or absence of a ransomware attack possibility that the number of the mark target pages is equal to or greater than a threshold.

According to a representative example of the invention, the impact of ransomware attack-attributable damage can be reduced. Tasks, configurations, and effects other than those described above will be clarified by the following description of the example.

BRIEF DESCRIPTION OF THE DRAWINGS

FIG. 5 illustrates a configuration example of an LDEV management table;

FIG. 7 illustrates a configuration example of a pool management table;

FIG. 10 illustrates a configuration example of a page access management table.

DESCRIPTION OF EMBODIMENTS

Figure 1:
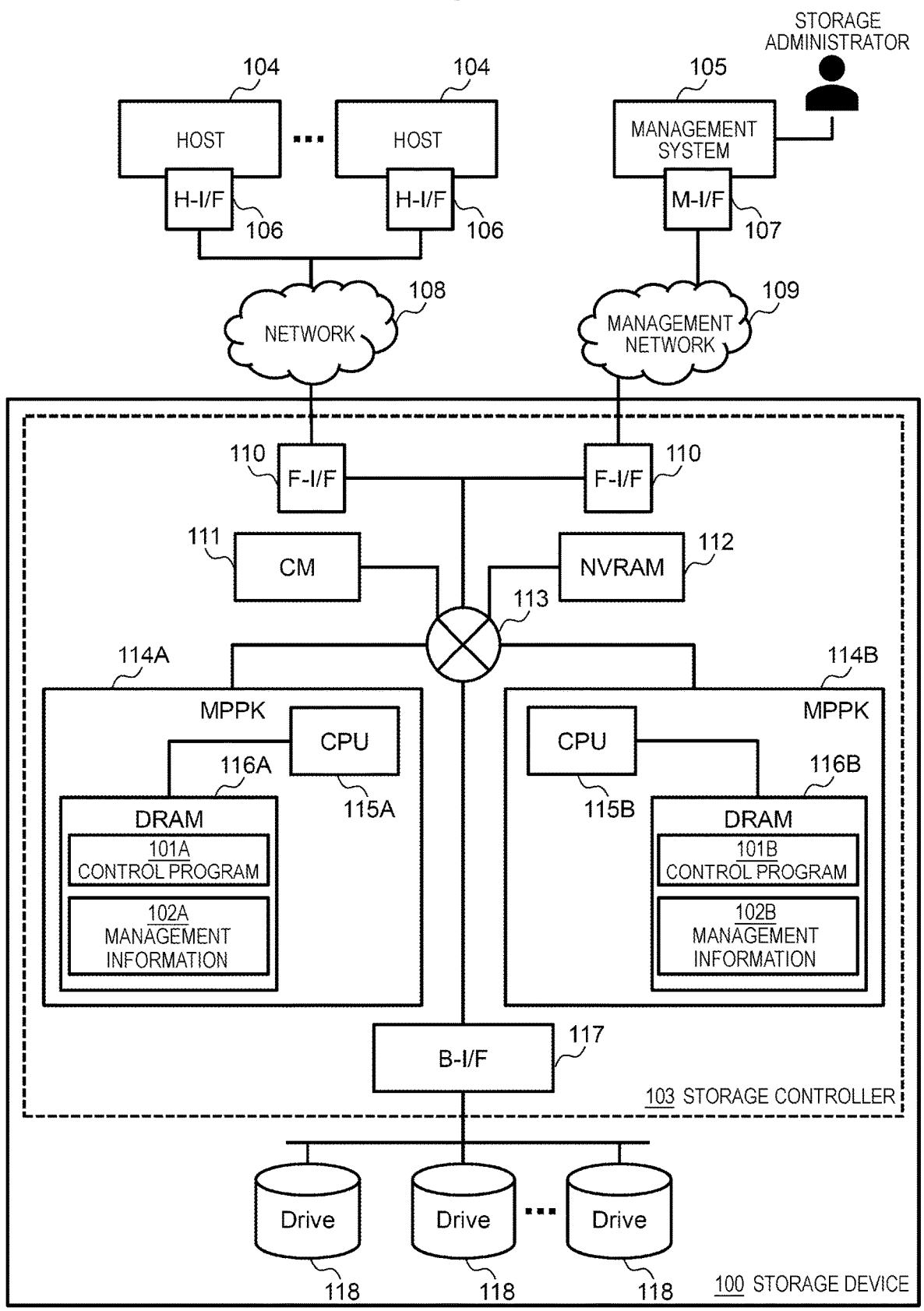
FIG. 1 illustrates a configuration example of a storage device according to an example.

An example of the invention will be described with reference to the drawings.

It should be noted that the example described below does not limit the claimed invention, and not all combinations of elements described in the example are essential to the solution of the invention.

In addition, in the following description, expressions such as "xxx table" and "xxx list" may be used to describe information that can be obtained as an output with respect to an input, and yet this type of information may be data of any structure or a learning model such as a neural network that generates an output with respect to an input. Therefore, "xxx table" and "xxx list" can be referred to as "xxx information". In addition, in the following description, the configuration of each table and each list is an example, one table or list may be divided into two or more tables or lists, and all or part of two or more tables or lists may be one table or list.

In addition, although "number" is used as identification information for each information, non-number information (for example, "name", "title", "ID") can be used instead of or in addition to the number as the identification information. In the drawings, the number is written as "#".

In addition, the following example of the invention may be implemented by software running on a general-purpose computer or by dedicated hardware or a software-hardware combination.

In addition, although processing may be described using "program" as a subject in the following description, the program is executed by a processor unit to perform predetermined processing while appropriately using, for example, a storage unit and/or an interface unit, and thus the subject of the processing may be the processor unit (or a device such as a controller that has the processor unit). The program may be installed on a device, such as a computer, from a program source. The program source may be, for example, a program distribution server or a computer-readable (for example, non-temporary) recording medium. In addition, in the following description, two or more programs may be implemented as one program or one program may be implemented as two or more programs.

In addition, in the following description, "host system" is at least one host computer. The at least one host computer may be a virtual computer that runs on a physical computer.

In addition, in the following description, "management system" is at least one management computer. The at least one management computer may be a virtual computer that runs on a physical computer. In addition, the management system may include a management computer as an input/output console (for example, a management computer as a client).

In addition, although "storage device" in the following description may be a storage device such as a so-called disk array device that has a plurality of PDEVs, the storage device may be a general-purpose computer instead (for example, a software-defined device such as a software-defined storage (SDS) and a software-defined data center (SDDC) implemented by installing and executing software for storage function demonstration). In addition, the storage device may have a function as at least a part of a host in addition to a function as a storage device.

In addition, in the following description, "PDEV" means a physical storage device, which may typically be a persistent storage device. The PDEV may be, for example, a hard disk drive (HDD) or a solid state drive (SSD). Different types of PDEVs may be mixed in the storage device.

In the following description, "interface device" may be at least one interface device. The at least one interface device may be at least one of the following.

At least one input/output (I/O) interface device. The input/output (I/O) interface device is an interface device with respect to at least one of an I/O device and a remote display computer. The I/O interface device with respect to the display computer may be a communication interface device. At least one I/O device may be any of a user interface device, an input device such as a keyboard and a pointing device, and an output device such as a display device.

At least one communication interface device. The at least one communication interface device may be at least one homogeneous communication interface device (for example, at least one network interface card (NIC)) or two or more heterogeneous communication interface devices (for example, a NIC and a host bus adapter (HBA)).

In addition, in the following description, "memory" is at least one memory device that is an example of at least one storage device, which may typically be a main storage device. At least one memory device in the memory may be a volatile memory device or a non-volatile memory device.

In addition, in the following description, "persistent storage device" may be at least one persistent storage device that is an example of at least one storage device. The persistent storage device may typically be a non-volatile storage device (for example, an auxiliary storage device), and specific examples thereof may include a hard disk drive (HDD), a solid state drive (SSD), a non-volatile memory express (NVME) drive, and a storage class memory (SCM).

In addition, in the following description, "processor" may be at least one processor device. Although the at least one processor device may typically be a microprocessor device such as a central processing unit (CPU), the at least one processor device may also be another type of processor device such as a graphics processing unit (GPU). The at least one processor device may be single-core or multi-core. The at least one processor device may be a processor core. The at least one processor device may be a processor device in a broad sense such as a circuit that is an aggregate of gate arrays in a description language on hardware performing part or whole of processing (for example, a field-programmable gate array (FPGA), a complex programmable logic device (CPLD), or an application specific integrated circuit (ASIC)).

In addition, in the following description, "RAID" is an abbreviation for redundant array of inexpensive disks. A RAID group may be an example of a persistent storage device, is configured by a plurality of PDEVs (typically, homogenous PDEVs), and stores data in accordance with the RAID level associated with the RAID group. The RAID group may be called a parity group. The parity group may be, for example, a parity-storing RAID group.

In addition, in the following description, "volume (VOL)" indicates a storage area of a storage, which may be implemented by a physical storage device or a logical storage device.

In addition, the VOL may be a real VOL (RVOL) or a virtual VOL (VVOL). "RVOL" may be a VOL based on physical storage resources (for example, at least one RAID group) of a storage device that has the RVOL. "VVOL" may be any of an external connection VOL (EVOL), a capacity expansion VOL (TPVOL), and a snapshot VOL. The EVOL is based on a storage space (for example, VOL) of an external storage device and may be a VOL that conforms to storage virtualization technology. The TPVOL may be a VOL that is configured by a plurality of virtual areas (virtual storage areas) and conforms to capacity virtualization technology (typically, thin provisioning).

"Storage pool (POOL)" is a logical storage area (for example, a set of a plurality of pool VOLs) and may be prepared for each application. For example, at least one of a TP pool and a snapshot pool may be the storage pool. The TP pool may be a storage area configured by a plurality of pages (units of a data storage area partitioned by a fixed size). In a case where a page is not allocated to the virtual area (virtual area of TPVOL) to which the address specified by a write request received from a host system (hereafter, host) by a storage controller belongs, a page is allocated to the virtual area (write-destination virtual area) from the TP pool (the page may be newly allocated to the write-destination virtual area even if a page has already been allocated to the write-destination virtual area). The storage controller may write write target data that accompanies the write request to the allocated page. The snapshot pool may be a storage area in which data saved from the original VOL is stored. A single pool may be used both as the TP pool and as the snapshot pool. "Pool VOL" may be a VOL that constitutes a pool. The pool VOL may be an RVOL or an EVOL.

In addition, "LDEV" in the following description is a VOL recognized from the host (VOL provided to the host by the storage device). In the following description, the LDEV is a TPVOL (or RVOL) and the pool is a TP pool. However, the invention can also be applied to a storage device in which capacity expansion technology (thin provisioning) is not employed.

In addition, in the following description, common reference numerals may be used in a case where homogeneous elements are described without being distinguished and reference numerals may be used in a case where homogeneous elements are distinguished.

FIG. 1 illustrates a configuration example of a storage device according to this example.

At least one host 104 is connected to a storage device 100 via a network 108. In addition, a management system 105 is connected to the storage device 100 via a management network 109. The network 108 is, for example, a fibre channel (FC) or an Internet small computer system interface (iSCSI). The management network 109 is, for example, the Internet or a wide area network (WAN). The network 108 and the management network 109 may be the same network.

The host 104 is short for host system and is at least one host. The host 104 has a host interface device (H-I/F) 106 and, via the H-I/F 106, transmits an access request (write request or read request) to the storage device 100 or receives a response to the access request (for example, a write response including write completion or a read response including read target data). The H-I/F 106 is, for example, a host bus adapter (HBA) or a network interface card (NIC).

The management system 105 manages the configuration and state of the storage device 100. The management system 105 has a management interface device (M-I/F) 107. Via the M-I/F, the management system 105 transmits a command to the storage device 100 and receives a response to the command. The M-I/F 107 is, for example, a NIC.

In addition, the management system 105 may be software executed on a server or PC that manages the storage device 100 or may be implemented as a security appliance or software function for managing the host 104 connected to the storage device 100. The management system 105 has a memory and a processor connected to the M-I/F 107 and the memory in addition to the M-I/F 107.

The storage device 100 has a plurality of drives 118 and a storage controller 103 connected to the plurality of drives 118. At least one RAID group including the plurality of drives 118 may be configured. The drive 118 is an example of a PDEV.

The storage controller 103 has a front-end interface device (F-I/F) 110, a back-end interface device (B-I/F) 117, a cache memory (CM) 111, a non-volatile RAM (NVRAM) 112, an MPPK 114A, an MPPK 114B, and a repeater 113 that relays communication between the elements. The repeater 113 is, for example, a bus or a switch.

The F-I/F 110 is an I/F for communication with the host 104 or a management server. The B-I/F 117 is an I/F for communication with the drive 118. The B-I/F 117 may include an E/D circuit (hardware circuit for encryption and decryption). Specifically, for example, the B-I/F 117 may include a serial attached SCSI (SAS) controller, and the SAS controller may include an E/D circuit.

In the CM 111 (for example, a dynamic random access memory (DRAM)), data written to the drive 118 or data read from the drive 118 is temporarily stored by the MPPK 114. The data in the CM 111 (for example, dirty data (data not written to the drive 118)) is saved in the NVRAM 112 by the MPPK 114 powered by a battery (not illustrated) when power is interrupted.

A cluster is configured by the MPPK 114A and the MPPK 114B. The MPPK 114A (MPPK 114B) has a DRAM 116A (DRAM 116B) and a CPU 115A (CPU 115B). The DRAM 116A (DRAM 116B) stores a control program 101A (control program 101B) executed by the CPU 115A (CPU 115B) and management information 102A (management information 102B) referenced or updated by the CPU 115A (CPU 115B). By executing the control program 101A (control program 101B) on the CPU 115A (CPU 115B), for example, I/O processing of the storage device 100 and address conversion processing are executed. At least one of the control program 101A (control program 101B) and the management information 102A (management information 102B) may be stored in a storage area (for example, the CM 111) shared by the plurality of MPPKs 114A and 114B.

The F-I/F 110 and the B-I/F 117 may be examples of interface devices. The CM 111, the NVRAM 112, and the DRAM 116 may be examples of memories. The drive 118 may be an example of a persistent storage device. The CPU 115 may be an example of a processor.

Figure 2:
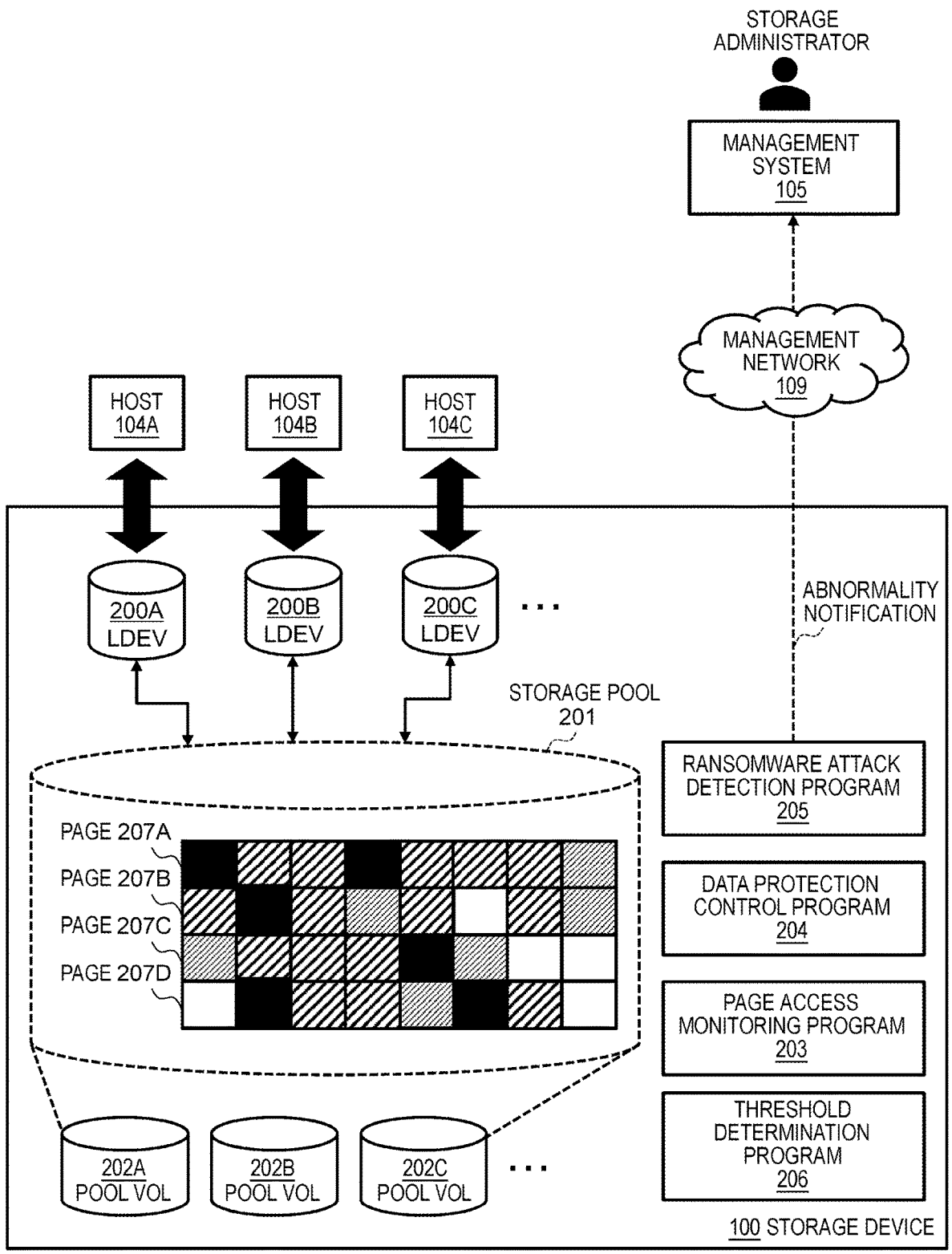
FIG. 2 illustrates an example in which the storage device is provided with a ransomware attack detection function.

FIG. 2 illustrates an example in which the storage device 100 is provided with a ransomware attack detection function.

The storage device 100 provides an LDEV 200, and the host 104 transmits an access request specifying the LDEV 200.

The LDEV 200 is actually a VOL. The storage device 100 associates the storage area of a storage pool 201 with the storage area of the LDEV 200 provided to the host 104 in page 207 units.

In addition, the storage area that constitutes the storage pool 201 is provided by a single or plurality of pool VOLs 202. The storage device 100 manages the correspondence between the pool VOL 202 that provides the storage area to the storage pool 201 and the storage pool 201.

In addition, the storage device 100 has a page access monitoring program 203, a data protection control program 204, a ransomware attack detection program 205, and a threshold determination program 206. The programs 203 to 206 are stored in the DRAM 116A (DRAM 116B) and executed by the CPU 115A (CPU 115B).

The page access monitoring program 203 monitors I/O information for each page 207 that constitutes the storage pool 201. For each page 207, the I/O information includes, for example, information representing at least one of page allocation status (unallocated or allocated), I/O type (read or write), I/O pattern (sequential access, random access), read access count, write access count, read data amount, and write data amount.

By using the I/O information of each page 207, the page access monitoring program 203 is capable of classifying the access characteristics of each page 207. For example, the page access monitoring program 203 is capable of classifying the access characteristics of the page 207 into any of the following access characteristics corresponding to the access characteristics of the corresponding page 207.

"HOT" as being frequently accessed from the host 104 and data update occurring frequently.
"NORMAL" as being accessed from the host 104 with a certain frequency and data update occurring.
"COLD" as being infrequently accessed from the host 104 and data update occurring.
"ARCHIVE" as being rarely accessed from the host 104 and data update rarely occurring.

Hereinafter, a page that has the access characteristics of "KKK" will be referred to as "KKK page". In this example, each page 207 in the storage pool 201 is one of a HOT page 207A, a NORMAL page 207B, a COLD page 207C, and an ARCHIVE page 207D. In addition, in this example, the I/O information for each page 207 is information including access status information (information 1003 to 1008) in entries of a page access management sub-table 1000 (see FIG. 10), which will be described later. In other words, the access characteristics of the page 207 are determined based on the access status information of the page 207.

By performing classification in accordance with the access characteristics of each page 207, the storage device 100 performs optimal page allocation corresponding to the performance characteristics of the pool VOL 202 that constitutes the storage pool 201 in accordance with the access characteristics of each page 207. Such control is commonly called "storage tiering". The storage tiering is, for example, as follows. In other words, in a case where the drives 118 such as SSDs and HDDs different in access performance (and data storage cost) are mixed in one storage device 100, the access performance (and data storage cost) differs for each pool VOL 202. Therefore, data storage efficiency can be improved in the storage device 100 by moving the data in the page 207 allocated to the LDEV 200 to the page 207 based on the drive 118 having the optimal access performance for the data access characteristics of the host 104 with respect to the LDEV 200.

Conceivable here is, for example, a case where a host 104A is infected with ransomware and the data of an LDEV 200A is encrypted (tampered). The ransomware encrypts the data stored in the LDEV 200A, and thus data update occurs with respect to the page 207 allocated to the LDEV 200A. At this time, the ransomware encrypts every page 207 allocated to the LDEV 200A, and thus data update is performed with respect to, for example, the ARCHIVE page 207D (page 207 of rare data update occurrence) as well.

Therefore, the ransomware attack detection program 205 detects an I/O access that may be a ransomware attack (data tampering) by detecting a case where data update has occurred with respect to a plurality of the ARCHIVE pages 207D allocated to the LDEV 200A in the storage pool 201 during a certain period of time.

In addition, in many cases, ransomware simultaneously infects the plurality of hosts 104. Therefore, it is conceivable that simultaneous data update is highly likely to occur with respect to, for example, the ARCHIVE page 207D allocated to the LDEV 200B and the LDEV 200C accessed from the host 104B and the host 104C in addition to the host 104A. Therefore, the ransomware attack detection program 205 detects the possibility of a ransomware attack when the data update frequency with respect to the ARCHIVE page 207D present in the storage pool 201 has become higher than normal during a certain period of time.

When the possibility of a ransomware attack (data tampering) is detected, the ransomware attack detection program 205 notifies a storage administrator of abnormality detection information (information representing abnormality detection) through the management network 109 and the management system 105 as an example of ransomware countermeasures. In addition, the data protection control program 204 takes a stored data protection measure as an example of ransomware countermeasures. As an example of the stored data protection measure, backups or snapshots of the LDEVs 200 may be acquired and a pre-ransomware possibility detection restore point may be created from the acquired backups or snapshots of the LDEVs 200 to enable easy data restoration. In addition, for example, ransomware may perform restore point and backup delete operations in the storage device 100, and the stored data protection measure may be to prevent backup and snapshot deletion by temporarily rejecting the operations. In addition, for example, the stored data protection measure may be to prevent ransomware-attributable data tampering by changing a data update access (write I/O) from the host that follows the detection of a potential ransomware attack behavior to an I/O mode called Copy-on-Write (CoW) (I/O mode in which pre-update stored data is temporarily saved in another area and then the stored data is updated).

Mitigation of ransomware attack-attributable damage and expedited recovery can be expected by detecting the possibility of a ransomware attack in the storage device 100 and taking a stored data protection measure as described above. It should be noted that the threshold determination program 206, as will be described later, determines a threshold of the number of ARCHIVE pages 207D that satisfy a predetermined condition.

Figure 3:
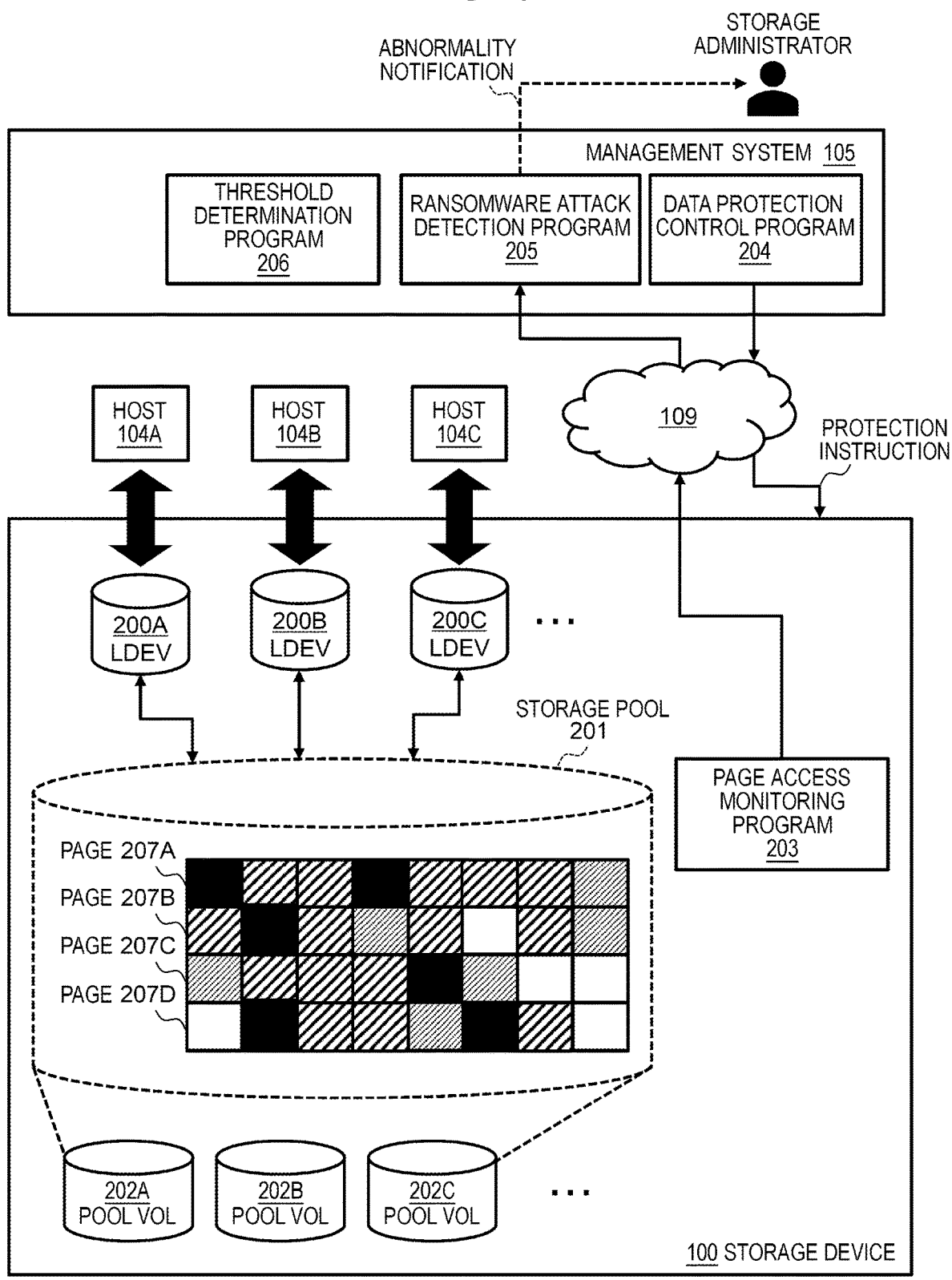
FIG. 3 illustrates an example in which a management system is provided with a ransomware attack detection function.

FIG. 3 illustrates an example in which the management system 105 is provided with a ransomware attack detection function.

The ransomware attack detection program 205, the data protection control program 204, and the threshold determination program 206 are implemented in the management system 105 installed outside the storage device 100 and executed by the processor of the management system 105.

Specifically, the page access monitoring program 203 in the storage device 100 regularly transmits I/O information 300 of each page 207 of the storage pool 201 to the ransomware attack detection program 205 of the management system 105 through the management network 109.

Based on the received I/O information 300, the ransomware attack detection program 205 in the management system 105 detects an I/O access of data update occurrence with respect to the ARCHIVE page 207D as well for each page 207 in the storage pool 201. In a case where it is detected that data update occurs with respect to the plurality of ARCHIVE pages 207D in the storage pool 201 during a certain period of time, the ransomware attack detection program 205 detects the possibility of a ransomware attack and notifies a storage administrator of abnormality detection information.

In addition, the data protection control program 204 in the management system 105 issues a protection instruction to the storage device 100 through the management network 109. In response to this protection instruction, the storage device 100 takes a stored data protection measure.

Mitigation of ransomware attack-attributable damage and expedited recovery can be expected by detecting the possibility of a ransomware attack in the storage device 100 and taking a stored data protection measure as described above.

This example will be described in detail below. It should be noted that the example illustrated in FIG. 2 is adopted in the following description.

Figure 4:
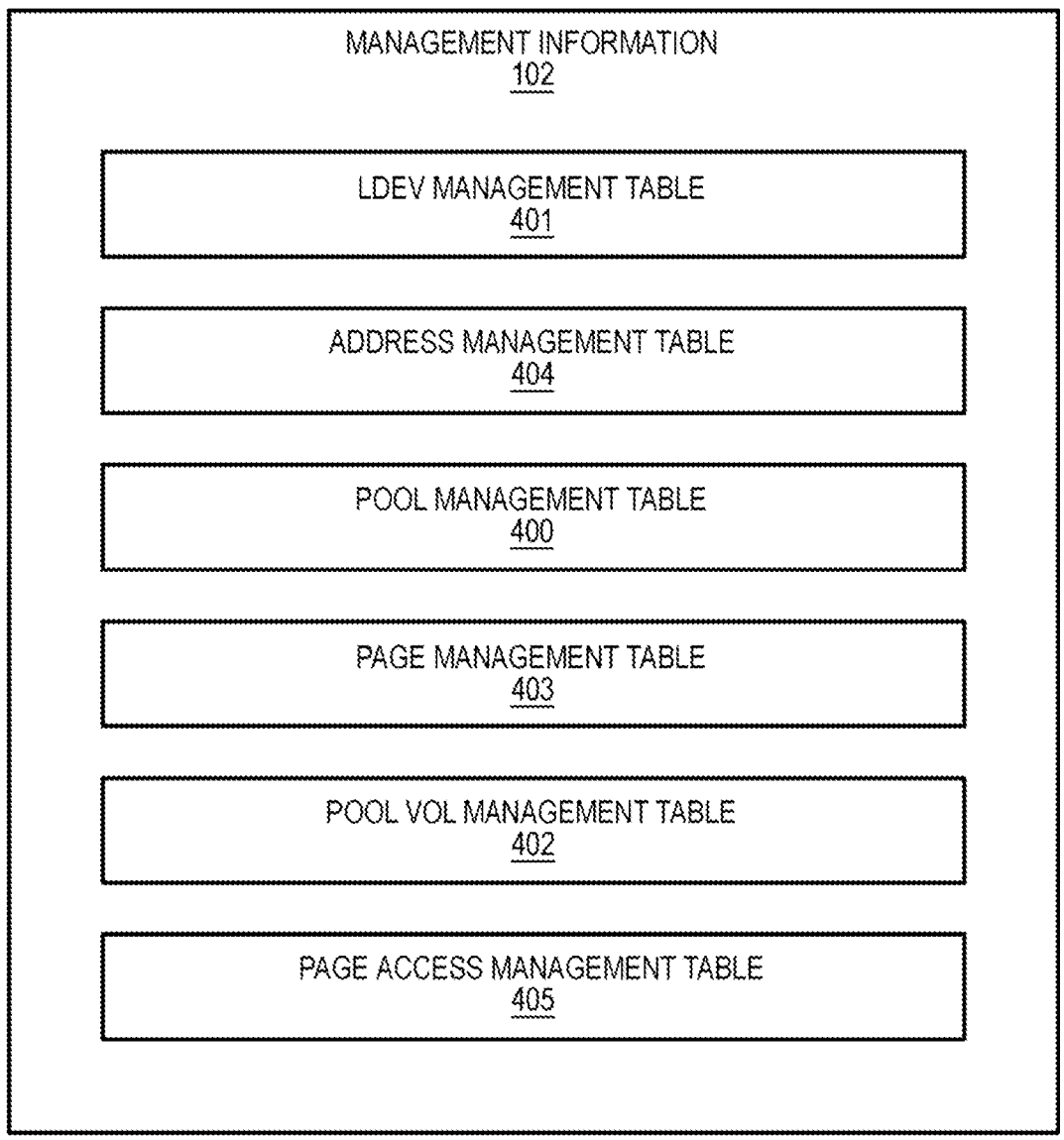
FIG. 4 illustrates a configuration example of management information.

FIG. 4 illustrates a configuration example of management information in the storage device 100.

Management information 102 is configured by a plurality of management tables used by a control program 101 in the storage controller 103 in the storage device 100. The management tables are, for example, an LDEV management table 401 retaining information on the LDEV 200, an address management table 404 retaining information on the correspondence relationship between the address of an area in the LDEV 200 and the address of an allocated page 207, a pool management table 400 retaining information on the storage pool 201, a page management table 403 retaining information for managing the page 207 in the storage pool 201, a pool VOL management table 402 retaining information on the pool VOL 202, and a page access management table 405 retaining information on the access status of the page 207.

FIG. 5 illustrates a configuration example of the LDEV management table 401.

The LDEV management table 401 has an entry (record) for each LDEV 200. The information stored in each entry is LDEV number 500, LDEV capacity 501, VOL type 502, and pool number 503.

The LDEV number 500 represents the identification number of the LDEV 200. The LDEV capacity 501 represents the capacity of the LDEV 200. The VOL type 502 represents the type of the LDEV 200 (for example, "RVOL" or "TPVOL"). The pool number 503 represents the identification number of the storage pool 201 with which the LDEV 200 is associated. The page 207 is allocated to the LDEV 200 from the storage pool 201 represented by the pool number 503 corresponding to the LDEV 200.

Figure 6:
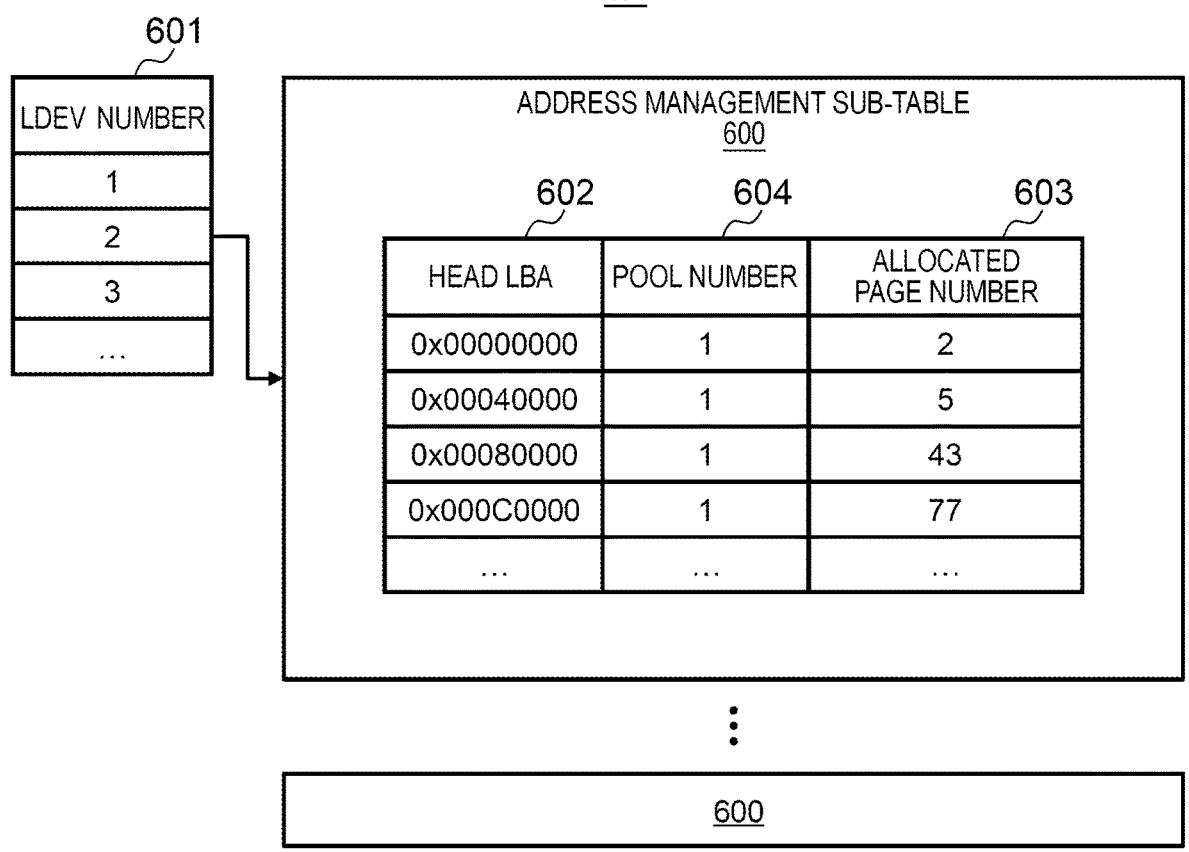
FIG. 6 illustrates a configuration example of an address management table.

FIG. 6 illustrates a configuration example of the address management table 404.

The address management table 404 is configured by an LDEV number list 601 and an address management sub-table 600 for each LDEV number. The address management sub-table 600 has an entry for each logical address range of the LDEV 200. The information stored in each entry is head LBA 602, pool number 604, and allocated page number 603.

The head LBA 602 represents the head LBA of the logical address range. The pool number 604 represents the identification number of the storage pool 201 having the allocated page number 603 represents the identification number of the allocated page 207.

FIG. 7 illustrates a configuration example of the pool management table 400.

The pool management table 400 has an entry for each storage pool 201. The information stored in each entry is pool number 703, pool capacity 700, pool allocated capacity 701, and pool used capacity 702.

The pool number 703 represents the identification number of the storage pool 201. The pool capacity 700 represents the defined capacity of the storage pool 201 (specifically, the sum of one or more VOL capacities respectively corresponding to one or more pool VOLs 202 that constitute the storage pool 201). The pool allocated capacity 701 represents the actual capacity allocated to at least one LDEV 200 associated with the storage pool 201 (specifically, the total capacity of all pages 207 allocated to one or more LDEVs 200). The pool used capacity 702 represents the total amount of data stored in the storage pool 201.

Figure 8:
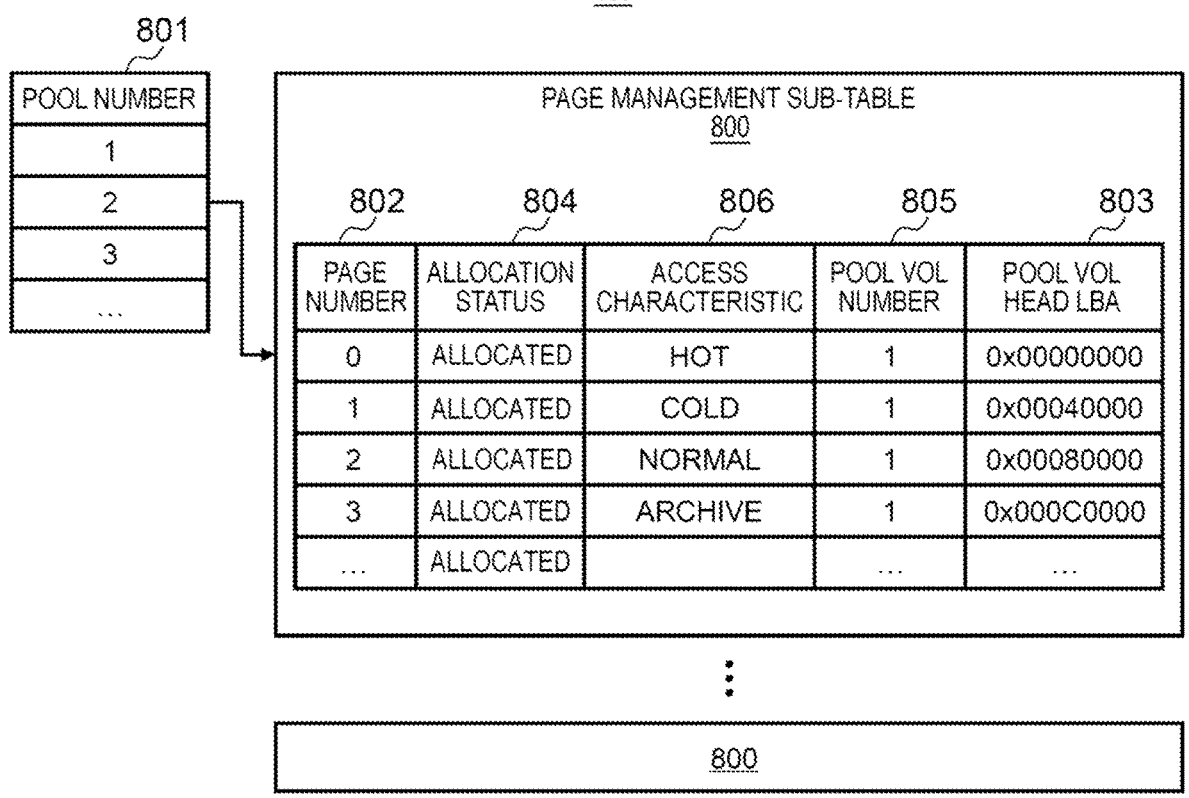
FIG. 8 illustrates a configuration example of a page management table.

FIG. 8 illustrates a configuration example of the page management table 403.

The page management table 403 is configured by a pool number list 801 and a page management sub-table 800 for each pool number. The page management sub-table 800 has an entry for each page 207 in the storage pool 201. The information stored in each entry is page number 802, allocation status 804, access characteristic 806, pool VOL number 805, and pool VOL head LBA 803.

The page number 802 represents the identification number of the page 207. The allocation status 804 represents the allocation status of the page 207. For example, "allocated" indicates a page-allocated status and "unallocated" indicates a page-unallocated status. The access characteristic 806 represents the access characteristic of the page 207 (specifically, "HOT", "COLD", "ARCHIVE", or "NORMAL" described above). The access characteristic is determined by the page access monitoring program 203 based on the I/O status from the host 104 for a certain period of time. The pool VOL number 805 represents the identification number of the pool VOL 202 having the page 207. The pool VOL head LBA 803 represents the head LBA of the page 207.

Figure 9:
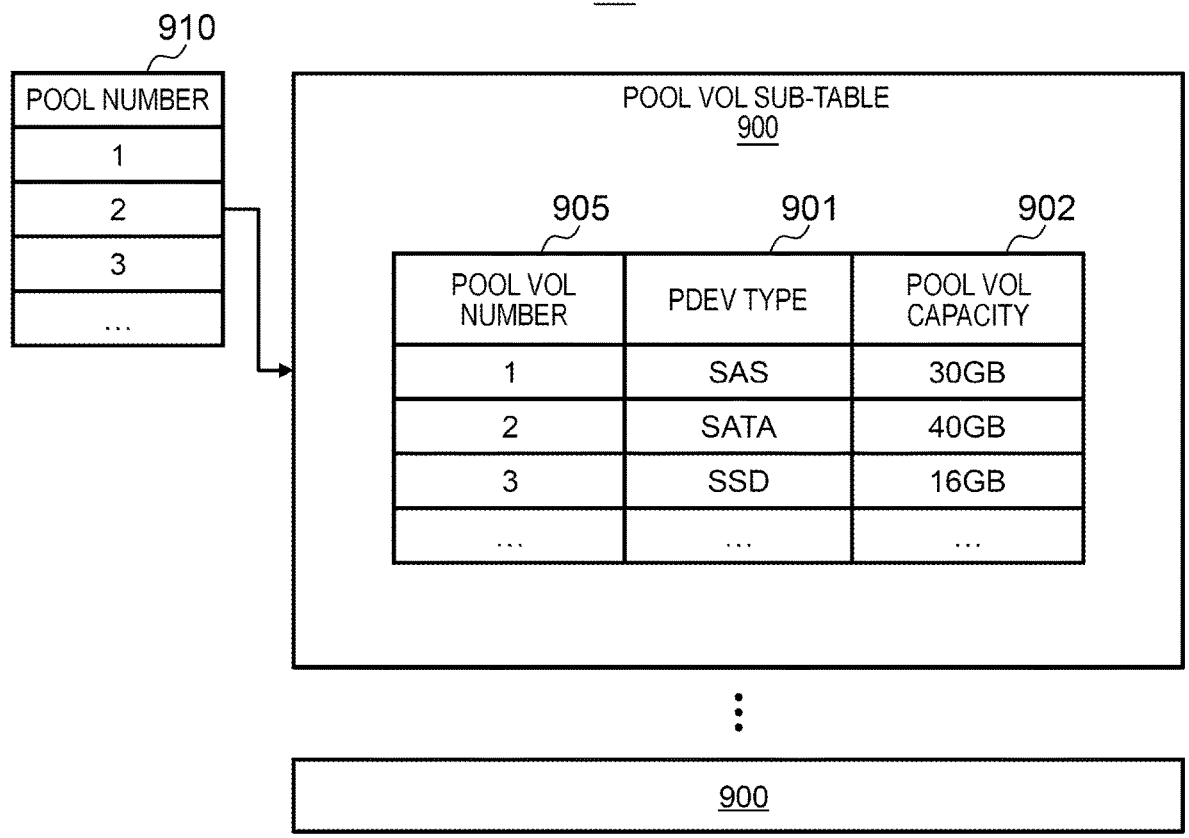
FIG. 9 illustrates a configuration example of a pool VOL management table.

FIG. 9 illustrates a configuration example of the pool VOL management table 402.

The pool VOL management table 402 has a pool number list 910 and a pool VOL sub-table 900 for each pool number. The pool VOL sub-table 900 has an entry for each pool VOL 202. The information stored in each entry is pool VOL number 905, PDEV type 901, and pool VOL capacity 902.

The pool VOL number 805 represents the identification number of the pool VOL 202. The PDEV type 901 represents the type of the PDEV on which the pool VOL 202 is based (drive 118 in this example). The pool VOL capacity 902 represents the capacity of the pool VOL 202.

FIG. 10 illustrates a configuration example of the page access management table 405.

The page access management table 405 is a table that retains information on the access status of each page 207 in the storage pool 201. The page access monitoring program 203 monitors the access status of each page 207 and the table 405 is updated.

The page access management table 405 has a pool number list 1010 and the page access management sub-table 1000 for each pool number. The page access management sub-table 1000 has an entry for each page 207 constituting the storage pool 201. The information stored in each entry is page number 1002, time stamp 1001, read I/O count 1003, write I/O count 1004, sequential access ratio 1005, random access ratio 1006, write data amount 1007, and read data amount 1008.

The page number 802 represents the identification number of the page 207. The time stamp 1001 represents a time stamp indicating the timing of accessing the page 207. The read I/O count 1003 represents the number of read I/Os with respect to the page 207. The write I/O count 1004 represents the number of write I/Os with respect to the page 207. The sequential access ratio 1005 represents the number of sequential accesses performed among accesses (I/O) to the page 207. The random access ratio 1006 represents the number of random accesses performed among accesses (I/O) to the page 207. The write data amount 1007 represents the cumulative amount of data written to the page 207. The read data amount 1008 represents the cumulative amount of data read from the page 207.

Figure 11:
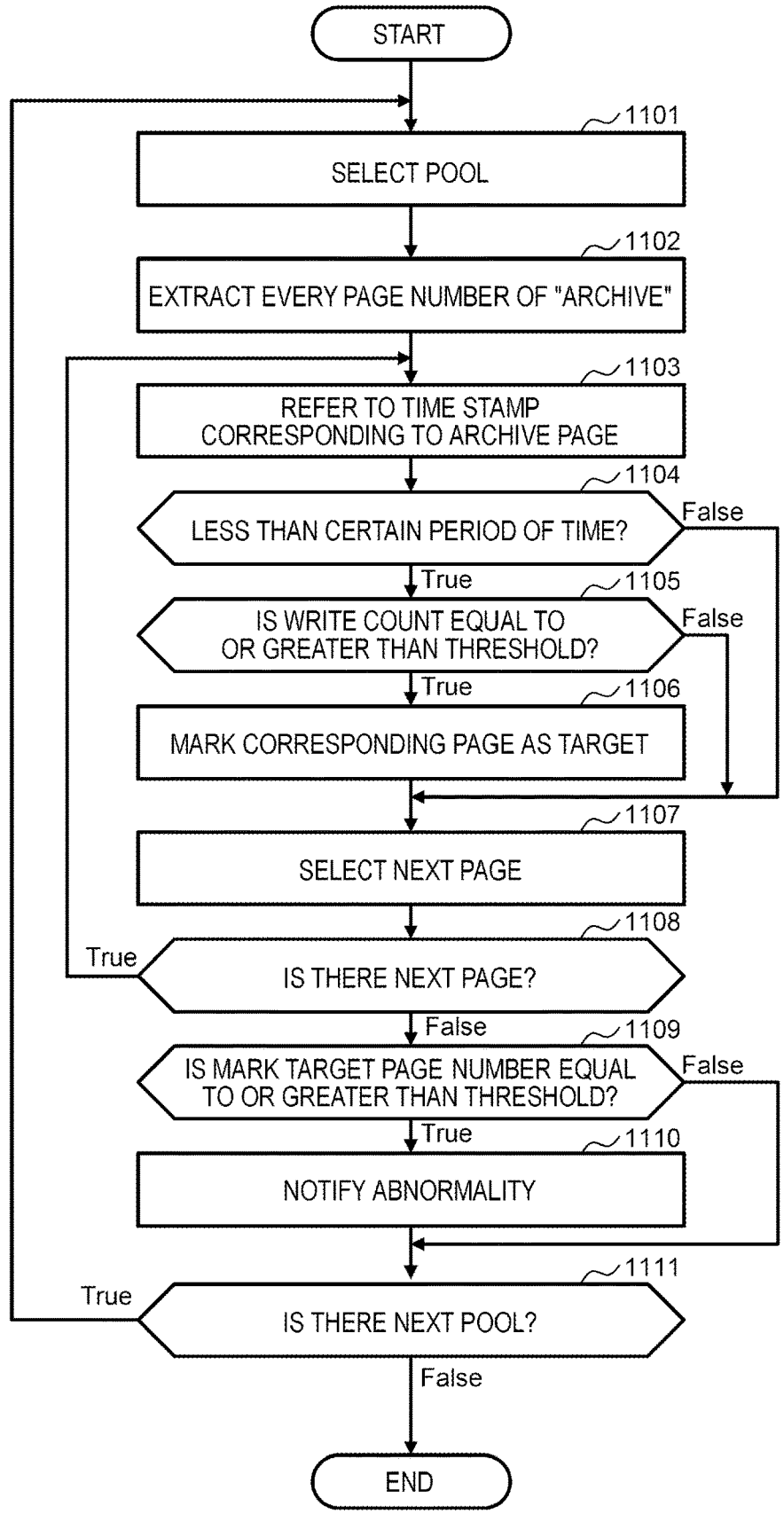
FIG. 11 illustrates an example of the flow of ransomware attack detection processing.

FIG. 11 illustrates an example of the flow of ransomware attack detection processing.

The ransomware attack detection processing may be performed regularly or may be performed in response to a predetermined event such as update of the page access management table 405. Although the ransomware attack detection processing is asynchronous with I/O processing responding to an access request specifying the LDEV 200, the ransomware attack detection processing may be synchronous with the I/O processing.

In step 1101, the ransomware attack detection program 205 refers to the pool management table 400 and selects the pool number of the storage pool 201 to be detected from the pool number list 801. The "storage pool 201 to be detected" may be the storage pool 201 that corresponds to the updated page access management sub-table 1000 or may be the storage pool 201 that is in the order of the ransomware attack detection processing in a predetermined order such as round robin.

In step 1102, the ransomware attack detection program 205 refers to the page management sub-table 800 corresponding to the storage pool 201 to be detected and extracts every page number 802 in which the access characteristic 806 is "ARCHIVE". The ransomware attack detection program 205 selects one of the extracted page numbers 802.

In step 1103, the ransomware attack detection program 205 refers to the page access management sub-table 1000 corresponding to the storage pool 201 to be detected and acquires an entry including the page number 1002 that matches the page number 802 selected in step 1102 (or step 1107).

In step 1104, the ransomware attack detection program 205 refers to the time stamp 1001 from the entry acquired in step 1103 and checks whether the time represented by the time stamp 1001 (for example, the last update time of the period of time from the current time (that is, less than a threshold). The processing proceeds to step 1107 in a case where this check result is false. On the other hand, the processing proceeds to step 1105 in a case where this check result is true.

In step 1105, the ransomware attack detection program 205 refers to the write I/O count 1004 from the entry acquired in step 1103 and checks whether the write count represented by the write I/O count 1004 is equal to or greater than a threshold. The processing proceeds to step 1106 in a case where this check result is true. On the other hand, the processing proceeds to step 1107 in a case where this check result is false.

In step 1106, the ransomware attack detection program 205 marks the page as a detection processing evaluation target.

In step 1107, the ransomware attack detection program 205 selects the next page number 802 out of the page numbers 802 extracted in step 1102.

In step 1108, the ransomware attack detection program 205 checks whether the next page number 802 was selected in step 1107. The processing returns to step 1103 in a case where this check result is true. The processing proceeds to step 1109 in a case where this check result is false.

In step 1109, the ransomware attack detection program 205 checks whether the number of pages marked as detection processing evaluation targets in step 1106 is equal to or greater than a threshold. In a case where this check result is true, intensive data update during a certain period of time has occurred with respect to a certain number or more of ARCHIVE pages 207D (data update has occurred with respect to normally unaccessed multiple ARCHIVE pages 207D), and thus a ransomware attack may be in progress. In this case, the processing proceeds to step 1110. On the other hand, the processing proceeds to step 1111 in a case where this check result is false.

In step 1110, the ransomware attack detection program 205 notifies the management system 105 of abnormality detection information. The abnormality detection information notification is an example of stored data protection measures.

In step 1111, the ransomware attack detection program 205 checks whether there is an unprocessed storage pool 201 to be detected. The processing returns to step 1101 in a case where this check result is true. The processing ends in a case where this check result is false.

Although one example has been described above, this is an exemplification for describing the invention and it is not intended to limit the scope of the invention only to this example. The invention can also be embodied in other forms.

It should be noted that the above description can be, for example, summarized as follows. The following summary may include supplementary description for the above description or description of a modification example.

The storage device 100 receives, from one of the hosts 104, an access request specifying one of one or more LDEVs 200 (one or more logical volumes provided to one or more hosts 104). In response to the access request, the storage device 100 accesses the page 207 allocated to the access destination area of the LDEV among the plurality of pages 207 (plurality of logical storage areas that can be allocated to one or more LDEVs 200). For example, the following may be performed.

The control program 101 refers to the address management sub-table 600 corresponding to the LDEV 200 specified by the access request and identifies whether the page 207 is allocated to the access destination area of the LDEV 200.

In a case where the access request is a write request and the page 207 is not allocated, the control program 101 identifies the pool number corresponding to the specified LDEV 200 from the LDEV management table 401, identifies an unallocated page (empty page) 207 from the page management sub-table 800 corresponding to the identified pool number, and allocates the identified page 207 to the access destination area in the LDEV 200.

The control program 101 accesses the allocated page 207. In addition, if necessary, the control program 101 updates the entry corresponding to the pool having the accessed page 207 in the pool management table 400.

The page access monitoring program 203 updates the access status of the accessed page 207 (at least part of the information 1001 to 1008).

Based on the management information 102 including information representing write status characteristics regarding each of the plurality of pages 207, the ransomware attack detection program 205 identifies a mark target page, which is a low-write frequency page where a certain number or more of writes have occurred during a certain period of time. The "low-write frequency page" is a page corresponding to a low write frequency defined as being relatively low in write frequency based on the write status characteristics among the plurality of pages 207. The ransomware attack detection program 205 checks the presence or absence of the possibility of a ransomware attack that the number of mark target pages is equal to or greater than a threshold.

Data update occurring with respect to two or more pages where data update does not occur normally indicates the possibility of ransomware-attributable data tampering or erroneous data operation, that is, the possibility of a ransomware attack, and the possibility is detectable. As a result, protection measures can be taken so as to prevent an increase in damage, and the impact of ransomware attack-attributable damage can be reduced. In addition, for example, although it is conceivable that ransomware simultaneously infects the plurality of hosts 104 in many cases and thus it is conceivable that simultaneous data update is highly likely to occur also with respect to the plurality of low-write frequency pages allocated to the plurality of LDEVs 200 accessed by the plurality of hosts, the ransomware attack detection program 205 can detect the possibility of a ransomware attack when the data update frequency with respect to the low-write frequency page present in the storage pool 201 has become higher than normal during a certain period of time.

It should be noted that the management information 102 may include the write time at each write occurrence for each page 207 or may include information representing the write count from a certain time, and it is possible to identify a low-write frequency page where a certain number or more of writes have occurred during a certain period of time from such management information 102. In addition, the "write status characteristics" may be represented by at least one of write frequency-representing information (for example, the write I/O count 1004 at certain time and later) and the access characteristic 806.

In addition, although an example of the low-write frequency page is the ARCHIVE page 207D, pages with other access characteristics such as the COLD page 207C, instead of the ARCHIVE page 207D, may also be examples of the low-write frequency page.

In a case where the above check result is false, one or more of the followings may be performed as ransomware countermeasures. As a result, it can be expected to reduce the impact of ransomware attack-attributable damage.

(a) Saving pre-update data (for example, Copy-On-Write) in a case where the target LDEV 200 that is the LDEV 200 to which the low-write frequency page where write has occurred during a certain period of time is allocated is a data write destination and write occurs for data update in the page 207 allocated to the target LDEV 200.

(b) In a case where an instruction for snapshot deletion from the target LDEV 200 is received, rejecting the instruction.

(c) In a case where the target LDEV 200 has a remote copy destination VOL (logical volume) and the data in the the remote copy destination VOL, saving the pre-update data in the remote copy destination VOL (for example, causing the remote copy destination storage device of the storage device 100 to execute the saving) or acquiring a snapshot of the remote copy destination VOL with, for example, the remote copy destination storage device and then copying the data to the remote copy destination VOL.

(d) Notifying a storage administrator of abnormality detection information which is information representing abnormality detection.

(e) Performing at least one of (a) to (d) with regard to not only the target LDEV 200 but also each of one or more non-target LDEVs 200 belonging to the same group (typically, the same host group) as the target LDEV 200.

It should be noted that at least (a) may be performed. In addition, (a), (b), and (c) may be performed by the data protection control program 204. (d) may be performed by the ransomware attack detection program 205. Regarding (e), the one or more non-target LDEVs 200 belonging to the same group (typically, the same host group) as the target LDEV 200 may be identified from the management information. For example, the data protection control program 204 may create at least one of backup data, restore point, and snapshot of the target LDEV 200 by autonomously protecting stored data.

The management information 102 may include the page access management table 405 (an example of page access management information) including information representing the access status for each of the plurality of pages 207 and the page management table 403 (an example of page management information) including information representing the access characteristics for each of the plurality of pages 207. For each of the plurality of pages 207, the access status of the page 207 may include the number of writes to the page (for example, the number of writes in a certain period). For each of the plurality of pages 207, the access characteristics of the page may be characteristics determined based on the write frequency of the page. The page access monitoring program 203 may update the access status corresponding to the page 207 and represented by the page access management table 405 each time the page 207 is accessed. For each of the plurality of pages 207, the ransomware attack detection program 205 may update the access characteristic 806 of the page represented by the page management table 403 based on the write frequency in the access status of the page and less frequently than the update of the access status of the page 207. In this manner, it is possible to cause the access characteristic 806 to follow access status update.

The plurality of pages 207 are the pages 207 based on a plurality of storage device groups different in access performance. Each of the plurality of pages 207 may be based on one of the plurality of storage device groups. Each storage device group may be a RAID group and may be at least one storage device. The control program 101 may perform storage tiering. The storage tiering may include moving, in a case where the access status of the page 207 is not suitable for the access performance of the storage device group on which the page is based (for example, the pool VOL 202 based on the storage device group), the data in the page 207 to a page based on a storage device group with access performance suitable for the access status of the page 207

(for example, a page in the pool VOL 202 based on the storage device group). In the storage tiering, for example, the control program 101 identifies a page in the pool VOL 202 with access performance suitable for the access status of the page 207 by referring to the page access management table 405 or the pool VOL management table 402. Therefore, at least some of the information used in the storage tiering can be effectively used for ransomware attack possibility detection.

The threshold determination program 206 may determine a mark target page count threshold based on, for example, the statistics of the write count of a low-write frequency page during a certain period of time and the number of low-write frequency pages. As an example, the statistics may be a distribution based on the relationship between the low-write frequency page number and the write count during a certain period of time (for example, a distribution in which the horizontal axis is the write count during the certain period of time and the vertical axis is probability density based on the low-write frequency page number). The mark target page threshold may be determined based on the condition that the number of low-write frequency pages written (updated) during a certain period of time is within X % of the total. In addition, for this statistical processing, not only the above method but also, for example, learning and using the distribution during normal operation using a machine learning algorithm may be used. As a result, the threshold becomes optimal, and thus improvement in the accuracy of ransomware attack possibility detection is expectable. For example, the threshold determination program 206 may determine the mark target page number threshold by inputting the write count of the low-write frequency page during a certain period of time and the low-write frequency page number to a machine learning model (specifically, a machine learning model for inputting the write count of the low-write frequency page and the low-write frequency page number and outputting the mark target page threshold). The machine learning model may be a neural network or another machine learning model.

Each of the ransomware attack detection program 205, the data protection control program 204, and the threshold determination program 206 may be in the storage device 100 or the management system 105. In a case where the management system 105 has at least the ransomware attack detection program 205, at least part of the management information 102 (for example, information in the page management table 403 and the page access management table 405) may be stored in the memory of the management system 105 and, based on the information, the ransomware attack detection program 205 is capable of checking the presence or absence of a ransomware attack possibility and the threshold determination program 206 is capable of determining the mark target page count threshold.

In addition, the page 207 may be an area in the LDEV 200 (for example, RVOL) instead of an area in the storage pool 201.

What is claimed is:

1. A storage device comprising:
a memory storing management information having management information including information representing a write status characteristic for each of a plurality of pages as a plurality of logical storage areas allocatable to one or more LDEVs; and
a processor receiving an access request specifying one of the one or more LDEVs from one of one or more hosts and, in response to the access request, accessing a page allocated to an access destination area of the LDEV among the plurality of pages, wherein
the one or more LDEVs are one or more logical volumes recognized from the hosts and provided to the hosts by the storage device,
of the plurality of pages, a page corresponding to a low write frequency defined as having a write count below a predetermined threshold write frequency based on the write status characteristic is a low-write frequency page, and
the processor:
identifies, based on the management information, a mark target page as a low-write frequency page where a certain number or more of writes have occurred during a certain period of time; and
determines presence or absence of a ransomware attack possibility by checking a number of mark target pages is greater than a threshold,
wherein the processor performs at least one of following as a ransomware countermeasure in a case where a result of the determining is absence:
saving pre-update data in a case where a target LDEV as an LDEV to which a low-write frequency page where write has occurred during the certain period of time is allocated is a data write destination and write occurs for data update in a page allocated to the target LDEV; and
notifying a storage administrator of abnormality detection information which is information representing abnormality detection.

2. The storage device according to claim 1, wherein the processor further performs at least one of following as the ransomware countermeasure in the case where the result of the determining is absence:
in in a case where an instruction for snapshot deletion from the target LDEV is received, rejecting the instruction;
in a case where the target LDEV has a remote copy destination logical volume and data in the page allocated to the target LDEV is remotely copied to the remote copy destination logical volume, saving pre-update data in the remote copy destination logical volume or acquiring a snapshot of the remote copy destination logical volume and then copying data to the remote copy destination logical volume; and
performing at least one of the saving of pre-update data, the notifying of the storage administrator of the abnormality detection information, the rejecting of the instruction, and saving pre-update data with regard to the target LDEV and each of one or more non-target LDEVs belonging to a same group as the target LDEV.

3. The storage device according to claim 2, wherein the processor performs at least the rejecting of the instruction in a case where the result of the determining is false.

4. The storage device according to claim 1, wherein the management information includes
page access management information including information representing an access status for each of the plurality of pages, and
page management information including information representing an access characteristic for each of the plurality of pages,
for each of the plurality of pages, the access status of the page includes the number of writes with respect to the page,
for each of the plurality of pages, the access characteristic of the page is a characteristic determined based on a page write frequency, the processor updates, each time a page is accessed, the access status corresponding to the page and represented by the page access management information, and for each of the plurality of pages, the processor updates the access characteristic of the page represented by the page management information based on the write frequency in the access status of the page and less frequently than the update of the access status of the page.

5. The storage device according to claim 4, wherein the plurality of pages are pages based on a plurality of storage device groups different in access performance, each storage device group is at least one storage device, each of the plurality of pages is based on one of the plurality of storage device groups, the processor performs storage tiering, and the storage tiering includes moving, in a case where the access status of a page is not suitable for access performance of a storage device group on which the page is based, data in the page to a page based on a storage device group with access performance suitable for the access status of the page.

6. The storage device according to claim 1, wherein the processor determines the threshold based on statistics of a write count of a low-write frequency page during the certain period of time and the number of low-write frequency pages.

7. The storage device according to claim 1, wherein the write status characteristic classifies each page into one of categories of HOT pages having a highest write frequency, NORMAL pages having a moderate write frequency, COLD pages having a low write frequency, and ARCHIVE pages having a lowest write frequency.

8. The storage device according to claim 1, wherein the processor classifies the plurality of pages based on the write status characteristic before identifying the mark target page.

9. The storage device according to claim 1, wherein the one or more LDEVs are logical volumes that are recognized by the one or more hosts as physical storage devices.

10. The storage device according to claim 1, wherein, before identifying of the mark target page, the processor classifies each of the plurality of pages as the low-write frequency page or not being the low-write frequency page based on the write status characteristic.

11. The storage device according to claim 1, wherein the processor classifies each of the plurality of pages as the low-write frequency page or not being the low-write frequency page based on the write status characteristic, wherein the write status characteristic classifies each page into one of categories of HOT pages having a highest write frequency, NORMAL pages having a moderate write frequency, COLD pages having a low write frequency, and ARCHIVE pages having a lowest write frequency, wherein the processor classifies the plurality of pages based on the write status characteristic before identifying the mark target pages, and wherein the one or more LDEVs are logical volumes that are recognized by the one or more hosts as physical storage devices.

12. A management system for a storage device, the management system comprising:

a memory storing management information including information representing a write status characteristic for each of a plurality of pages as a plurality of logical storage areas allocatable to one or more LDEVs; and a processor connected to the memory, wherein the one or more LDEVs are one or more logical volumes recognized from hosts and provided to one or more of the hosts by the storage device, the storage device receives an access request specifying one of the one or more LDEVs from one of the one or more hosts and, in response to the access request, accesses a page allocated to an access destination area of the LDEV among the plurality of pages, of the plurality of pages, a page corresponding to a low write frequency defined as having a write count below a predetermined threshold for write frequency based on the write status characteristic is a low-write frequency page, and the processor:

identifies, based on the management information, a mark target page as a low-write frequency page where a certain number or more of writes have occurred during a certain period of time; and determines presence or absence of a ransomware attack possibility by checking a number of mark target pages is greater than a threshold, wherein the processor performs at least one of following as a ransomware countermeasure in a case where a result of the determining is absence:

saving pre-update data in a case where a target LDEV as an LDEV to which a low-write frequency page where write has occurred during the certain period of time is allocated is a data write destination and write occurs for data update in a page allocated to the target LDEV; and notifying a storage administrator of abnormality detection information which is information representing abnormality detection.

13. A management method of storage device that receives an access request specifying one of one or more LDEVs as one or more logical volumes recognized from hosts and provided to one or more hosts by the storage device from one of the one or more hosts and, in response to the access request, accesses a page allocated to an access destination area of the LDEV among a plurality of pages as a plurality of logical storage areas allocatable to the one or more LDEVs, the method comprising:

identifying a mark target page as a low-write frequency page where a certain number or more of writes have occurred during a certain period of time based on management information including information representing a write status characteristic for each of the plurality of pages by a computer;

the low-write frequency page being a page corresponding to a low write frequency defined as having a write count below a predetermined threshold for write frequency based on the write status characteristic; and determining presence or absence of a ransomware attack possibility by checking a number of mark target pages is greater than a threshold by the computer, performing at least one of following as a ransomware countermeasure in a case where a result of the determining is absence:

saving pre-update data in a case where a target LDEV as an LDEV to which a low-write frequency page where write has occurred during the certain period of time is allocated is a data write destination and write occurs for data update in a page allocated to the target LDEV; and notifying a storage administrator of abnormality detection information which is information representing abnormality detection.

* * * * *